United States Patent
Fournie et al.

(10) Patent No.: US 8,864,189 B2
(45) Date of Patent: Oct. 21, 2014

(54) AIRCRAFT LATCH COMPRISING A HOOK AND A HANDLE

(75) Inventors: Jacques Fournie, Grenade (FR); Christophe Bernus, Toulouse (FR); Thony Dupas, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 370 days.

(21) Appl. No.: 13/379,134

(22) PCT Filed: Jun. 18, 2010

(86) PCT No.: PCT/FR2010/051226
§ 371 (c)(1),
(2), (4) Date: Dec. 19, 2011

(87) PCT Pub. No.: WO2010/149905
PCT Pub. Date: Dec. 29, 2010

(65) Prior Publication Data
US 2012/0102842 A1    May 3, 2012

(30) Foreign Application Priority Data
Jun. 22, 2009 (FR) .................... 09 54215

(51) Int. Cl.
*B65D 45/34* (2006.01)
*E05C 19/14* (2006.01)
*E05C 19/12* (2006.01)
*E05B 63/06* (2006.01)

(52) U.S. Cl.
CPC ............. *E05C 19/145* (2013.01); *E05C 19/14* (2013.01); *E05B 63/06* (2013.01); *E64D 29/06* (2013.01); *Y10S 292/49* (2013.01); *Y10S 292/60* (2013.01)
USPC ........ 292/256.69; 292/DIG. 49; 292/DIG. 60

(58) Field of Classification Search
CPC ........ E05C 19/14; E05C 19/145; E05B 63/06
USPC .............. 292/113, 256.69, DIG. 49, DIG. 60
See application file for complete search history.

(56) References Cited

U.S. PATENT DOCUMENTS

| | | | |
|---|---|---|---|
| 2,904,141 A * | 9/1959 | Henrichs | 403/321 |
| 2,927,812 A * | 3/1960 | Smith et al. | 292/196 |
| 4,053,177 A | 10/1977 | Stammreich et al. | |
| 4,116,479 A * | 9/1978 | Poe | 292/113 |

(Continued)

FOREIGN PATENT DOCUMENTS

| | | |
|---|---|---|
| CN | 1816675 A | 8/2006 |
| DE | 28 28 033 A1 | 1/1980 |
| EP | 1 336 707 A1 | 8/2003 |
| EP | 2444575 * | 4/2012 |

OTHER PUBLICATIONS

International Search Report issued in International Patent Application No. PCT/FR2010/051226 dated Nov. 15, 2010.

(Continued)

*Primary Examiner* — Carlos Lugo
(74) *Attorney, Agent, or Firm* — Oliff PLC

(57) ABSTRACT

An aircraft latch including a main hook; an operating lever; a safety device; a button on the operating lever and fastened to the safety device; and adjustment means attached to the safety device for adjusting the position of the safety device with respect to the main hook.

8 Claims, 2 Drawing Sheets

(56) References Cited

U.S. PATENT DOCUMENTS

| | | | |
|---|---|---|---|
| 4,183,564 A * | 1/1980 | Poe | 292/113 |
| 4,318,557 A * | 3/1982 | Bourne et al. | 292/113 |
| 4,530,529 A * | 7/1985 | Poe et al. | 292/113 |
| 4,602,812 A * | 7/1986 | Bourne | 292/113 |
| 5,011,200 A | 4/1991 | Glancy et al. | |
| 5,620,212 A * | 4/1997 | Bourne et al. | 292/113 |
| 6,325,428 B1 | 12/2001 | Do | |
| 6,343,815 B1 | 2/2002 | Poe | |
| 2003/0151261 A1 | 8/2003 | Porte et al. | |
| 2006/0138785 A1 | 6/2006 | Vauchel | |

OTHER PUBLICATIONS

French Search Report issued in French Patent Application No. 0954215 dated Jan. 26, 2010 (with translation).

Written Opinion issued in International Application No. PCT/FR2010/051226 dated Nov. 15, 2010.

Jan. 17, 2014 Office Action issued in Chinese Patent Application No. 201080027638.4 (with Statement of Relevance).

* cited by examiner

AIRCRAFT LATCH COMPRISING A HOOK AND A HANDLE

The invention relates to aircraft latches.

BACKGROUND OF THE INVENTION

There are numerous door members in aircraft that are held by a latch in a predetermined position, e.g. a closed position. These members, referred to herein as "doors" may be constituted, for example, by covers, hatches, or indeed radomes. The latch includes a hook suitable for engaging an attachment point that is fastened to a base. It also includes a lever for operating the hook, which lever is generally accessible through an opening in the door, the lever being hinged both to the door and also to the hook.

The outside face of the lever is thus visible and accessible through the opening in the door. This face is usually of a plane shape that is designed to extend flush with the face of the door. Nevertheless, it can happen that when the latch is in the closed position, the outside face of the lever does not extend the outside face of the door, which is generally undesirable for reasons of aerodynamic drag or of appearance. This can be remedied by adjusting the position of the attachment point of the hook. The angle of inclination of the lever in the closed position of the latch depends in particular on the position of the hook on the attachment point. Nevertheless, such an adjustment is difficult to perform: it is necessary to open the door in order to access the attachment point, then to adjust it, then adjust the length of the hook itself by means of a member provided for this purpose on the hook. The distance between the attachment point and the hinge between the hook and the lever has an influence on the force that the operator needs to exert on the lever when closing the latch. Once these operations have been performed, the door is reclosed and examined to see whether the lever has an appropriate angle of inclination. If it does not, then these operations need to be restarted. As a general rule, these operations will be performed several times, thus making the procedure iterative. In addition, the same operations need to be repeated as many times as there are latches to adjust.

OBJECT AND SUMMARY OF THE INVENTION

An object of the invention is to obtain a satisfactory angle of inclination for the lever in the closed position of the latch.

To this end, the invention provides an aircraft latch that includes an operating lever and adjustment means for adjusting an angle of inclination of the lever when the latch is in a closed position, said means being controllable on the lever.

There is thus no need to open and close the latch numerous times while making the adjustment. A suitable angle of inclination for the lever can thus be obtained in a manner that is particularly simple and fast.

Advantageously, the adjustment means are operable when the latch is in the closed position.

Thus, while performing the adjustment itself, it is possible to verify whether the correct position has been obtained, and when appropriate to interrupt operations immediately.

Preferably, the latch includes a safety device suitable for preventing the latch being operated by means of the lever and presenting a dimension that is adjustable.

Provision may be made for the adjustment means for adjusting the angle of inclination to comprise the safety device.

Thus, it is by modifying the length of the safety device that the correct angle of inclination is obtained for the lever. This thus serves to ensure that the latch does not need to have an additional mechanism that is entirely devoted to performing this adjustment.

In one embodiment, the latch has a main hook, the safety device including a safety hook fastened to an element selected from the lever and the main hook by fastener means that enable a position of the safety hook relative to said element to be adjusted.

In another embodiment, the latch has a main hook, the safety device including a rod and a safety hook suitable for engaging the rod, the rod being fastened to an element selected from the lever and the main hook by fastener means that enable a position of the rod relative to said element to be adjusted.

Advantageously, the fastener means comprise a screw-and-nut connection.

Preferably, the nut is self-locking.

This avoids the adjustment means coming out of adjustment in unwanted manner.

Advantageously, the latch includes a main hook and adjustment means for adjusting a length of the main hook.

It is thus possible to adjust the force that the operator needs to exert when closing the latch.

The invention also provides an assembly that comprises:
a base;
a door; and
a latch suitable for holding the door in a closed position relative to the base, said latch comprising an operating lever and adjustment means for adjusting an angle of inclination of the lever in a closed position of the latch, the adjustment means being controllable from outside the door.

Preferably, the adjustment means are controllable while the door is in the closed position.

The invention also provides an aircraft including a latch of the invention or an assembly of the invention.

BRIEF DESCRIPTION OF THE DRAWINGS

Other characteristics and advantages of the invention appear further from the following description of two embodiments given as non-limiting examples and with reference to the accompanying drawings, in which.

MORE DETAILED DESCRIPTION

Figure 1:
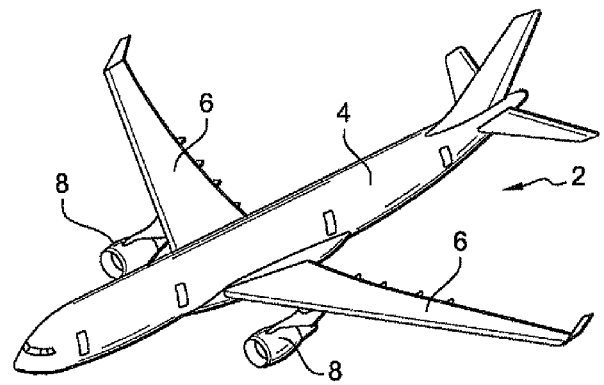
FIG. 1 is a perspective view of an aircraft including assemblies of the invention.
Figure 2:
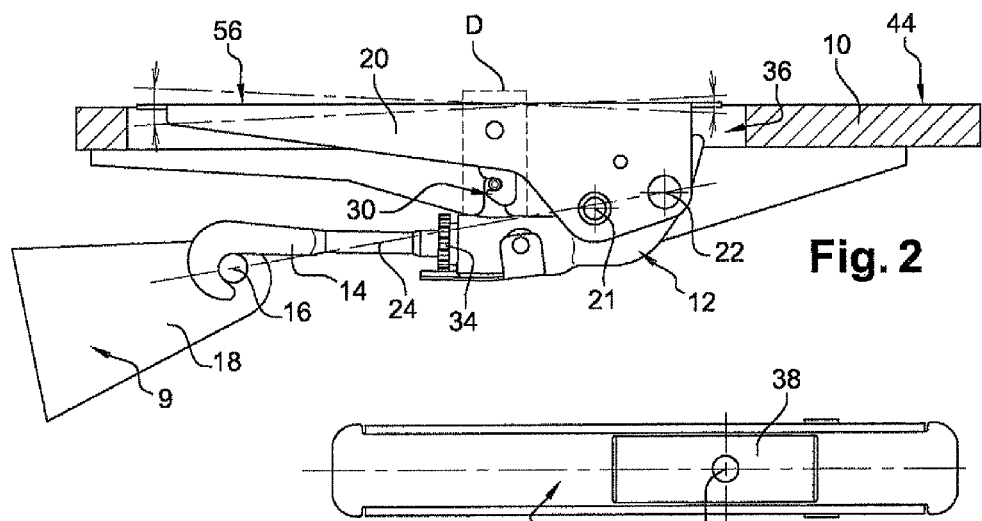
FIG. 2 is a section view of one of these assemblies, showing a latch of the invention.
Figure 3:
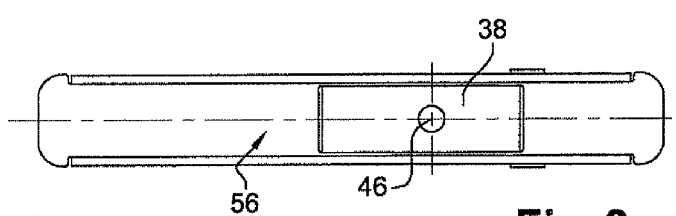
FIG. 3 is a face view of the FIG. 2 latch.

FIG. 1 shows an aircraft 2 including assemblies and latches of the invention. Specifically, the aircraft is an aerodyne, and in this example it is an airplane. The airplane has a fuselage 4 and two wings 6 carrying respective engines 8.

The airplane includes covers, hatches, and radomes, each constituting an assembly of the invention. Each assembly comprises a base 9 that is stationary relative to the structure of the airplane, e.g. being rigidly fastened to the fuselage, and a flap or "door" 10. The door is mounted to move relative to the base 9, e.g. being hinged about an axis. It may occupy a predetermined position, such as a closed position in which it closes an opening in the base, thereby separating the outside and the inside of the assembly and preventing access to the inside.

The assembly includes a latch 12 of the invention that is used to hold the door 10 in a closed position. The latch comprises a main hook 14 of elongate shape presenting a curved portion at its free end that is suitable for engaging a rod 16 of an attachment point 18 of the base 9. The latch 12 includes a handle-forming lever 20 enabling an operator to move the latch and in particular the hook. The lever is mounted to move in an opening or slot 36 in the door 10. The lever 20 is hinged firstly to the door 10 about an axis 21 and secondly to the hook 14 about an axis 22. The rod 16 and the axes 21 and 22 are parallel to the hinge axis of the door.

The latch is shown on each occasion in the closed position. In this position, the hook is subjected to forces along a line 24 that passes through the axis of the rod 16 and the axis 22. In the closed position, this line 24 extends beyond the axis 21. During the closing movement, this line is crossed by the axis 21. This configuration enables the latch to be held naturally in the closed position regardless of the force exerted on the latch along the line 24.

The hook 14 carries a device 34 for adjusting its length, e.g. comprising a screw-and-nut assembly, which device enables the latch 12 to be adapted to the real position of the attachment point 18, thereby adjusting the lever force that the operator needs to exert on the lever when closing the latch.

The latch also includes a safety device or trigger 30. This device comprises firstly a safety rod 31 and a safety hook 32, here a pair of hooks, suitable for engaging the rod 31. In the present example, the rod 31 is carried by the main hook 14 while the safety hook 32 is carried by the lever 20. The safety device 30 constitutes a latch that is internal to the latch 12. When the hook 32 engages the rod 31, as shown in the figures, the device 30 prevents the main hook 14 being moved by means of the lever 20. The safety hook 32 and its rod maintain a constant distance between the main hook and the lever. This additional latching serves to make closure of the latch secure by preventing any unwanted swinging movement of the lever. In order to open the latch 12, the operator must therefore begin by releasing the safety device in order to disengage the latch 32 from the rod 31.

The latch 12 includes a button 38 that is hinged to the lever about an axis 40 of the lever and that is movable in an opening 42 in the wall of the lever. The button 38 carries the hook 32. When the operator presses on the button 38 on its end situated on the side of the axis 40 that is opposite from the side on which the safety hook 32 is situated, that causes the button to rock and disengage the hook 32 from the rod 31, thereby releasing the safety device.

The first embodiment as shown in FIGS. 5 to 8 is described below.

Figure 4:
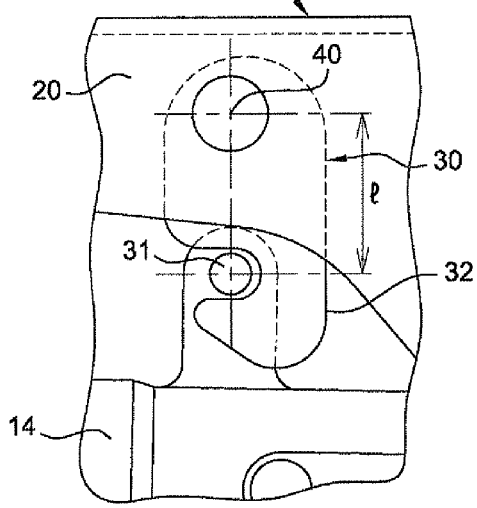
FIG. 4 is a view on a larger scale of a detail D of the FIG. 2 latch.
Figure 5:
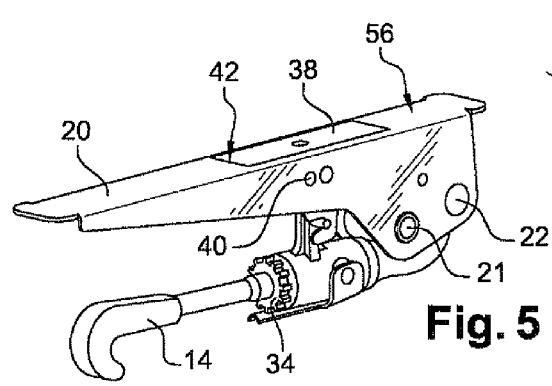
FIG. 5 is a perspective view of the latch in a first embodiment.
Figure 6:
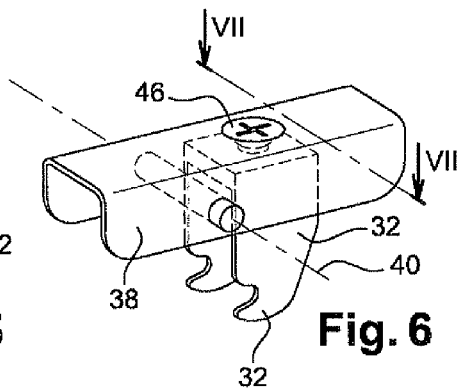
FIG. 6 is a perspective view of the safety member of the FIG. 5 latch.
Figure 7:
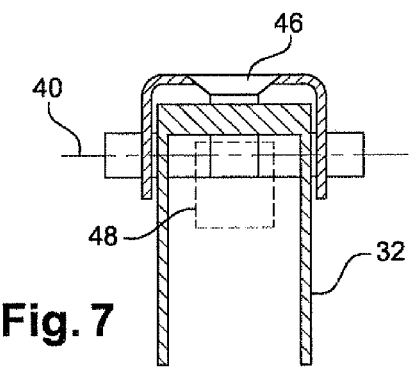
FIG. 7 is a section view on plane VII-VII of the FIG. 6 latch.
Figure 8:
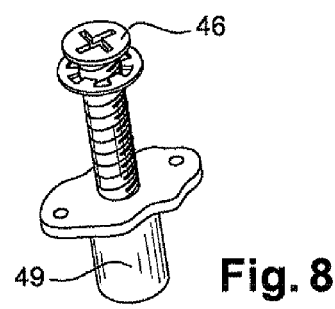
FIG. 8 shows the screw-and-nut connection of the latch.
Figure 9:
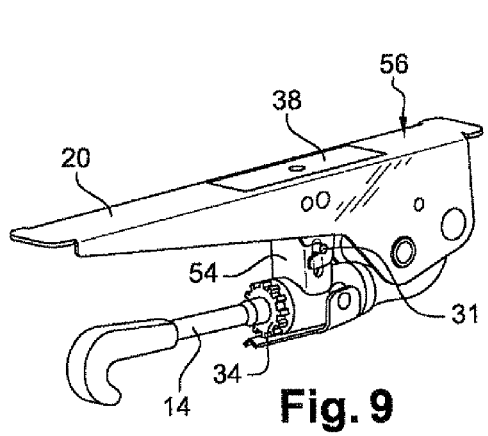
FIG. 9 is a view analogous to FIG. 5 showing a second embodiment of the latch.
Figure 10:
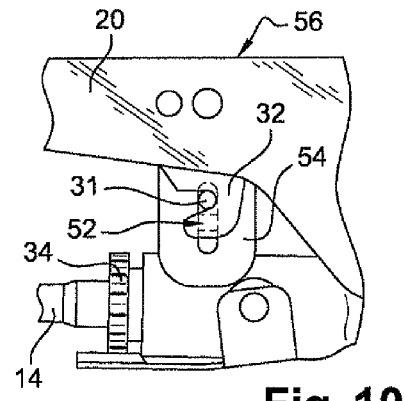
FIGS. 10 and 11 are respectively an elevation view and a plan view of the FIG. 9 latch.
Figure 11:
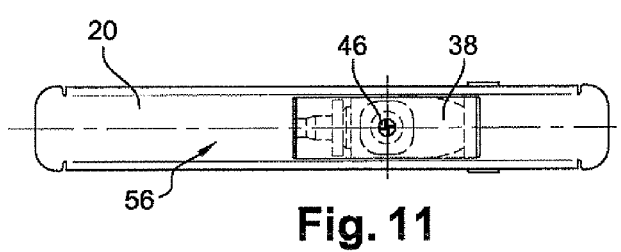
Figure 12:
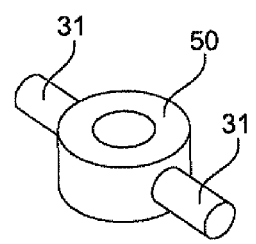
FIG. 12 is a perspective view of the nut carrying the rod in the FIG. 9 latch.

The hook 32 is fastened to the button 38. The rod is rigidly fastened in non-adjustable manner to the hook 14. Means are provided to modify the position of the hook relative to the button in the direction perpendicular to the plane outside face 56 of the lever and the outside face 44 of the door. Specifically, these means comprise a screw 46 passing through axially-aligned orifices in the button 38 and the hook 32. The orifice in the button 38 is not tapped, but the orifice in the hook 32 is tapped so as to engage with the screw. The screw may also engage close to its free end with a nut, such as a self-locking nut 48 as shown in FIG. 7, or with a receptacle 49 of the kind known under the name "EN6092" and shown in FIG. 8. By turning the head of the screw that is contiguous with the face 56, the helical connection between the screw 46 and the hook causes the hook to move up or down relative to the button, thereby modifying the dimension l of the safety device 30. This dimension is shown in FIG. 4 and is measured between the axis 40 and the axis of the rod 31.

A second embodiment is shown in FIGS. 9 to 12. Here the safety hook 32 is rigidly fastened to the button 38 in non-adjustable manner. It is the position of the rod 31 relative to the main hook 14 that can be adjusted. For this purpose, the rod 31 is subdivided into two portions that are rigidly fastened to a nut 50 and that extend in line with each other on either side of the nut, perpendicularly to the main axis of the nut. The hook 14 includes a bushing 54 of generally cylindrical shape extending perpendicularly to the general direction of the hook and towards the lever. The bushing 54 has two opposite vertical rectilinear elongate grooves 52 into which respective portions of the rod 32 penetrate. These portions are thus slidably movable together with the nut 50 in the bushing 54. A screw 56 is provided that passes through an orifice in the button 38 and an orifice in the hook 32, both of these orifices being non-tapped, and finally it engages with the nut 50. By turning the screw, once more by acting on the head of the screw that is contiguous with the face 56, it is possible to modify the position of the rod 31 and thus the dimension l of the safety device.

In both of these embodiments, there is thus a safety device 30 of adjustable dimension l, which dimension is measured in a direction that is not parallel to the hook 14 and to the lever 20. This adjustment amounts to modifying the total length of the safety device 30. It may be carried out when the latch is in the closed position and the flap is in the closed position, by means of the screw 46 that lies in the outside face 56 of the lever and that is thus accessible from outside the assembly. It should be observed here that the attachment point 18 is not accessible once the flap is closed.

Changing the dimension of the safety device gives rise to a change in the angle between the lever 20 and the hook 14, and thus to a change in the angle of inclination or the "trim" of the lever 20 relative to the outside face 44 of the door. It is thus possible to adjust this angle of inclination so that the outside face 56 of the lever lies in continuity with or extending the outside face 44 of the door.

By way of example, the attachment point 18 may be situated on the fuselage, the wing, a nacelle, etc.

It should be observed that the invention also makes it possible optionally to have means for adjusting the position of the attachment point 18. This is particularly advantageous insofar as the systems for adjusting these points that accommodate substantial forces are generally of considerable weight.

Naturally, numerous modifications may be applied to the invention without going beyond the ambit thereof. Provision may be made for the safety hook to be fastened to the main hook and not to the lever, and likewise for the rod 31 to be fastened to the lever and not to the main hook.

What is claimed is:

1. A latch mounted on a movable member for latching with a stationary member on an aircraft, the latch comprising:
   a main hook configured to engage a member on a base;
   an operating lever pivotally attached to the main hook and configured to disengage the main hook from the member;
   a safety device configured to engage the main hook and suitable for preventing the latch being operated by means of the lever;
   a button on the operating lever and fastened to the safety device configured to disengage the safety device and allow the operating lever to disengage the main hook from the member; and
   adjustment means attached to the safety device for adjusting the position of the safety device with respect to the main hook.

2. A latch according to claim 1, wherein the adjustment means are operable when the latch is in the closed position.

3. A latch according claim 1, wherein
   the main hook includes a rod and the safety device including a safety hook suitable for engaging the rod.

4. A latch according to claim 1, wherein the adjustment means comprise a screw-and-nut connection.

5. A latch according to claim 4, wherein the nut is self-locking.

6. A latch according to claim 1, wherein the adjustment means adjust a length of the main hook.

7. An assembly comprising:
   a base;
   a door; and
   a latch suitable for holding the door in a closed position relative to the base, said latch comprising:
      a main hook adapted to engage a portion of the base;
      an operating lever pivotally attached to the main hook and configured to move the main hook;
      a safety device configured to engage the main hook and suitable for preventing the latch being operated by means of the lever;
      a button on the operating lever and fastened to the safety device configured to disengage the safety device and allow the operating lever to disengage the main hook from the member; and
      adjustment means attached to the safety device for adjusting the position of the safety device with respect to the main hook.

8. An assembly according to claim 7, wherein the adjustment means are controllable while the door is in the closed position.

* * * * *